US012636846B2

(12) United States Patent
Cicci

(10) Patent No.: US 12,636,846 B2
(45) Date of Patent: May 26, 2026

(54) AUTO-MASK FOR PACKAGING

(71) Applicant: Joseph Cicci, Bloomfield, NJ (US)

(72) Inventor: Joseph Cicci, Bloomfield, NJ (US)

(73) Assignee: CO2 PACKAGING LLC, Sarasota, FL (US)

( * ) Notice: Subject to any disclaimer, the term of this patent is extended or adjusted under 35 U.S.C. 154(b) by 0 days.

(21) Appl. No.: 18/817,941

(22) Filed: Aug. 28, 2024

(65) Prior Publication Data

US 2026/0061719 A1 Mar. 5, 2026

(51) Int. Cl.

| | |
|---|---|
| ***B31B 50/04*** | (2017.01) |
| ***B31B 50/00*** | (2017.01) |
| ***B31B 50/62*** | (2017.01) |
| ***B31B 50/81*** | (2017.01) |
| ***B31D 5/00*** | (2017.01) |
| ***B31F 5/04*** | (2006.01) |
| ***B65D 5/50*** | (2006.01) |

(52) U.S. Cl.

CPC .......... *B31B 50/044* (2017.08); *B31B 50/006* (2017.08); *B31B 50/042* (2017.08); *B31B 50/624* (2017.08); *B31B 50/811* (2017.08); *B31D 5/0004* (2013.01); *B31F 5/04* (2013.01); *B65D 5/5057* (2013.01)

(58) Field of Classification Search

CPC .. B31D 1/0087; B31D 5/0004; B31D 5/0008; B31F 5/04; B65D 81/133; B65D 5/5057; B65D 5/5059; B65D 5/5038; B31B 50/042; B31B 50/044; B31B 50/006; B31B 50/624; B31B 50/811; B31B 2120/407

USPC .......................................................... 493/110

See application file for complete search history.

(56) References Cited

U.S. PATENT DOCUMENTS 5,108,355 A * 4/1992 Walsh ..................... B31B 50/81 493/110
5,224,919 A * 7/1993 Walsh ..................... B31B 50/00 493/110
5,622,264 A * 4/1997 Wetterlund .......... B65D 5/5038 206/391
6,062,287 A * 5/2000 Ernest ....................... E04B 1/78 156/542
6,350,333 B1 * 2/2002 Welch ................ B65H 35/0006 156/64
8,087,140 B2 * 1/2012 Koshio ................ G02B 5/3033 29/709

(Continued)

FOREIGN PATENT DOCUMENTS

EP 2072241 A2 * 6/2009 ............. B31B 50/00
WO WO-9626136 A1 * 8/1996 ........... B65D 5/5038

(Continued)

*Primary Examiner* — Joshua G Kotis
(74) *Attorney, Agent, or Firm* — Henry I. Schanzer

(57) ABSTRACT

Apparatus for automatically attaching a decorative mask to an underlying tray, where the tray has apertures for the placement therein of customer products and the mask has apertures corresponding to those of the tray. The apparatus includes mechanisms for placing the masks and the trays along conveyor belts, for applying glue to the top surface of the tray for enabling the tray and mask to be attached, and sensing means for determining the respective locations of the trays and the masks to ensure precise registration of the apertures of the masks with the corresponding apertures of the tray.

14 Claims, 5 Drawing Sheets

(56) References Cited

U.S. PATENT DOCUMENTS

| | | | | |
|---|---|---|---|---|
| 9,011,617 | B2 * | 4/2015 | Mayer | B32B 38/1833 156/364 |
| 2002/0077236 | A1 * | 6/2002 | Chalendar | B31B 50/00 493/19 |
| 2007/0228036 | A1 * | 10/2007 | Noyelle | B65D 81/3446 219/730 |
| 2012/0297736 | A1 * | 11/2012 | Ausnit | B65D 5/20 493/393 |
| 2019/0308382 | A1 * | 10/2019 | Graham | B31B 50/044 |
| 2020/0009818 | A1 * | 1/2020 | Walsh | B31B 50/624 |
| 2021/0024248 | A1 * | 1/2021 | Hallam | B31B 50/044 |
| 2021/0229857 | A1 * | 7/2021 | Pintucci | B65D 5/5038 |
| 2023/0391507 | A1 * | 12/2023 | Marini | B65D 5/5038 |
| 2024/0150078 | A1 * | 5/2024 | Marini | B32B 27/10 |
| 2024/0327060 | A1 * | 10/2024 | Bonnini | B65D 81/133 |
| 2025/0019115 | A1 * | 1/2025 | Heinen | B65D 5/5042 |
| 2025/0282131 | A1 * | 9/2025 | Kohler | B31B 50/62 |

FOREIGN PATENT DOCUMENTS

| | | | | |
|---|---|---|---|---|
| WO | WO-9729905 | A1 * | 8/1997 | B65H 9/166 |
| WO | WO-0073152 | A1 * | 12/2000 | B65C 9/42 |
| WO | WO-2024003341 | A1 * | 1/2024 | B31B 50/06 |

* cited by examiner

AUTO-MASK FOR PACKAGING

The present invention relates to packaging and in particular to an improved process for automatically applying a "mask" to an "insert" (also referred to herein as a "tray" or "substrate") with the masked-insert combination being intended to be placed in a box or package, where the masked-insert combination is used to securely hold products, such as, for example, consumer goods (e.g., perfume bottles).

BACKGROUND OF THE INVENTION

Historically, manufacturers of packaging products used vacuum formed plastic tray inserts with appropriately shaped forms to receive and securely hold items such as perfume bottles, tubes and jars in rigid set-boxes and or windowed folding cartons. However, to meet present environmental requirements, it has become preferable, or necessary, to eliminate the use of plastic materials. The plastic tray inserts may be replaced with a wide range of paperboard/cardboard based tray inserts which may be corrugated and available in a wide range of flute and liner combinations to meet the exact requirements of a user. Cut outs (also referred to herein as "apertures" or "cavities") are formed in these paperboard/cardboard tray inserts to hold selected consumer goods (e.g., perfume bottles).

However, a significant problem exists because the paperboard/cardboard based tray insert materials, used to make these tray inserts, are naturally brown, flat white, or a vat dyed color with a very limited color palette. These are very plain and do not provide a "Deluxe" appearance for the type of high class consumer goods (e.g., perfumes) which they contain and which are being sold. Presently, to overcome the problem and provide a desired Deluxe appearance, a specially designed layer of a selected material with a Deluxe appearance (also referred to herein and in the appended claims as a "mask") is formed with cut outs (apertures/cavities) to match the cut outs (apertures/cavities) of the top surface of the paper/cardboard based tray insert designed to hold the desired items. The specially designed layer ("mask") is currently manually applied to the paper/cardboard based tray insert.

To manually secure the mask to the tray presents several problems. Some of the more significant ones are as follows:

1. The registration of the mask apertures need to correspond to the tray apertures. To do this manually requires the operator to align and adjust the mask and the tray. The eye balling process is error prone and time consuming.
2. To enable the mask to remain fixed when placed on the tray, hot melt glue is used. Hot melt glue application leaves visual lumps. Also, the hot melt glue is hand applied resulting in a non-uniform layer with disfiguring lumps and bumps.
3. The need to manually align and adjust the mask to the insert tray is slow and costly.

Thus, manually placing a mask on a tray results in a wide range of human error in registration, inconsistent glue placement, and a significant labor cost.

It is therefore desirable to have a more efficient and reliable means for applying a mask to an underlying tray with a high degree of precision and which is also more economical.

Note: in the discussion to follow and in the accompanying claims reference to a "tray" is meant to include reference to a tray insert or a substrate on whose top surface a "mask" is to be attached. The "trays" used to practice the invention may be formed of any material having qualities and characteristics of the following materials:

(a) cardboard, also known as paperboard, which is a hardened, thicker, and stronger form of paper than standard writing paper. Cardboard's added thickness and structure make it more solid and versatile.

(b) Chipboard, also known as paperboard, is a thick, single-layer paper stock made from compressed paper fibers, often recycled. It's a versatile material that can be used in many applications, including shipping, packaging, and crafting. It is typically denser than cardboard.

(c) Solid Bleach Sulfite (SBS) paperboard and variations thereof which combines the benefits of chipboard with a unique coating.

The materials listed above in (a), (b) and (c) may also be corrugated, and may be referred to as corrugated fiberboard or corrugated cardboard. Corrugated paperboard is a type of paperboard packaging that has extra layers of cardboard that are crimped into a zig-zag pattern. The middle layer of corrugated paperboard has a wavy shape called flutes, which gives the packaging its distinctive look. The materials described above in their corrugated or un-corrugated form, and any like materials may be used to form the "trays" used to practice the invention.

SUMMARY OF THE INVENTION

Applicants' invention is directed to a novel process and method for taking a decorative mask having a deluxe appearance and automatically applying the mask to an underlying tray/insert/substrate in an efficient and reliable manner.

In accordance with the invention a decorative mask is placed with pinpoint registration and attached onto an underlying paperboard/cardboard/chipboard based tray insert (which may be corrugated or un-corrugated) by means of apparatus which includes a glue applicator, sensors (e.g., for edge detection) and conveyor belts with speed control mechanisms for accurately and automatically mating a mask with a tray.

Applicants' invention is directed to the automatic application of a mask to an underlying tray (i.e., an auto-masking process) which addresses the essential problems of:

1. Registration of mask apertures with the tray apertures by providing pinpoint registration.
2. Pad gluing application in-line allows deposits of water based glue in numerous areas without causing thick glue deposits which results in blemishing lumps and bumps. That is, consistent glue placement.
3. Providing a tray with a mask attached so as to reduce the cost of manual labor and the assembly time.

In accordance with the invention, the tray, with the decorative mask affixed, is then ready to be placed within a package or box, and for selected items to be inserted therein. This eliminates the extra cost, time, and manpower when the consumer product is placed with the box/package (fulfillment stage).

BRIEF DESCRIPTION OF THE DRAWINGS

In the accompanying drawings which are not drawn to scale, like reference characters denote like components.

DETAILED DESCRIPTION OF THE INVENTION

Figure 1:
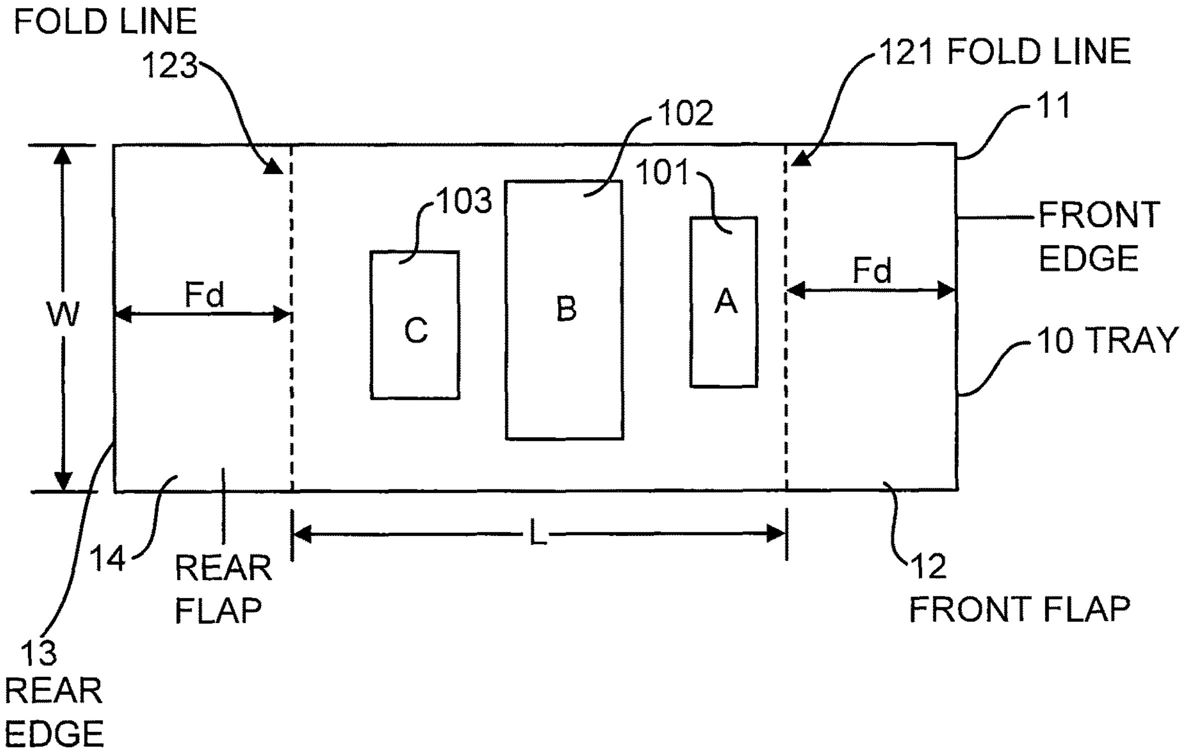
FIG. 1 is a top view of a tray (also referred to as a "substrate" or "insert") with cut outs ("pockets" or "apertures") intended to hold selected products.

Referring to FIG. 1 there is shown a tray 10 designed and formed with cut outs 101, 102 and 103 (also identified as A, B and C, respectively) to hold preselected products. The three cut outs (also referred to as "apertures" or "pockets") are shown for purpose of illustration only; there could be fewer or more cut outs.

Figure 3:
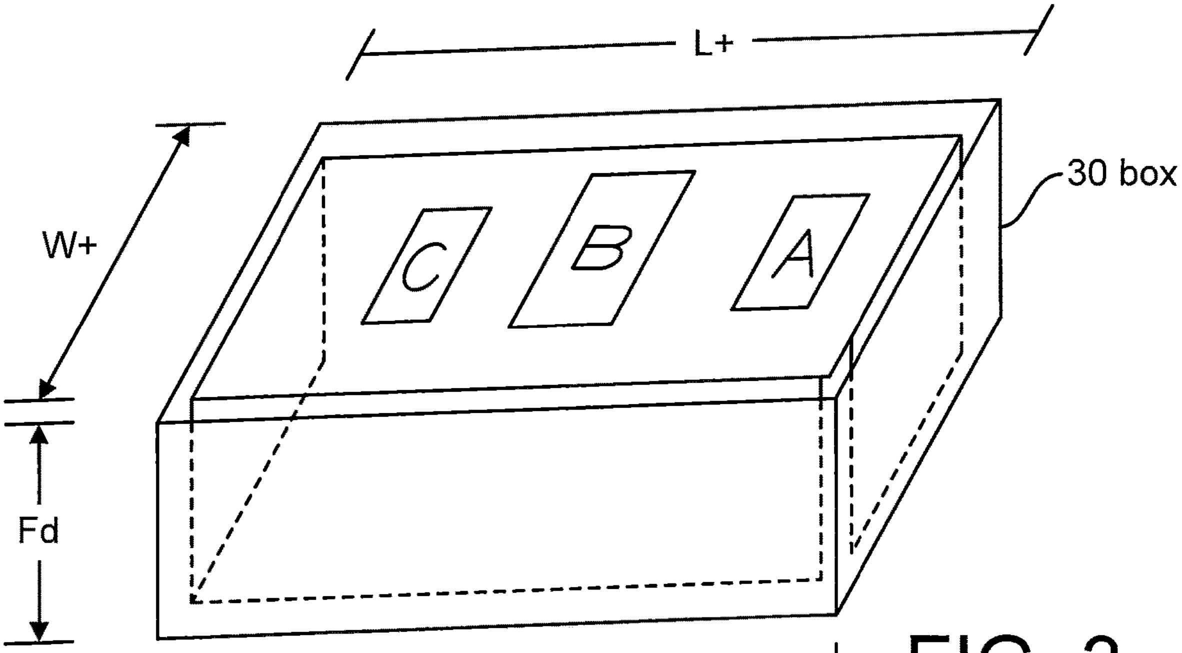
FIG. 3 is a simplified isometric drawing of a box/package in which a mask and tray are placed ready for selected items to be mounted in the "pockets"
Figure 3A:
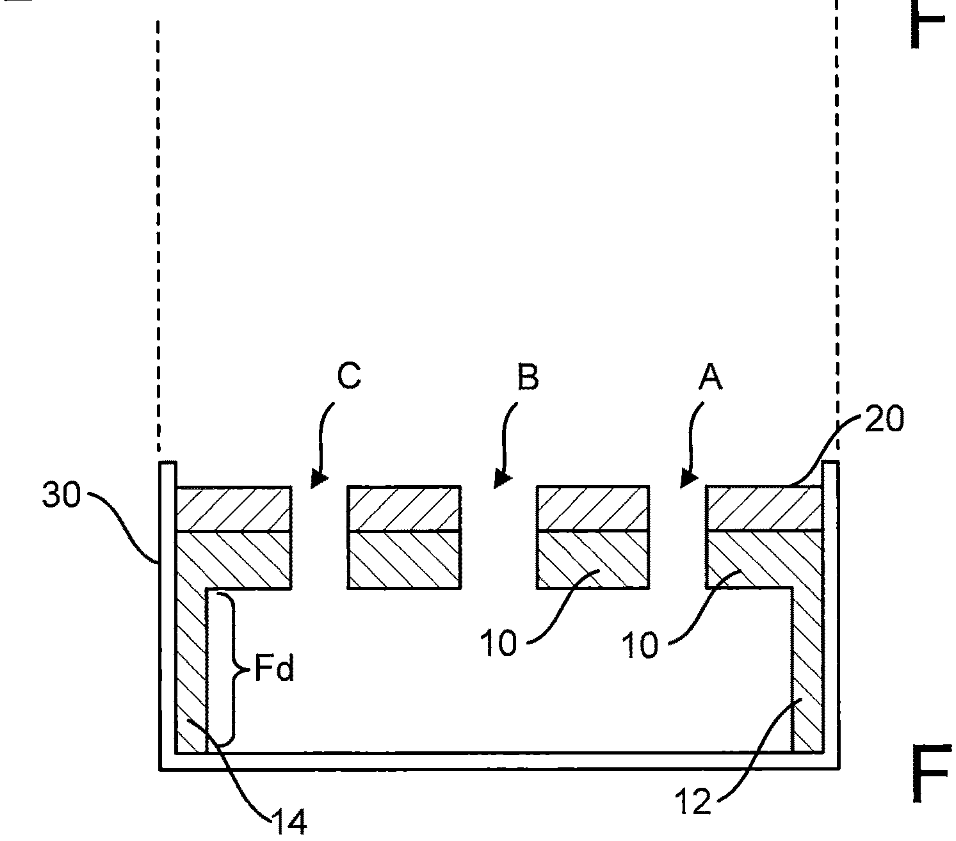
FIG. 3A is a cross-sectional diagram of the mask, tray and box of FIG. 3.

The tray 10 has a top surface area of length L and width W which will define the "exposed" area of the tray. As shown in FIG. 1, the tray 10 includes a front retractable extension, flap 12 of length Fd which extends from foldable line 121 to front edge 11 and a rear retractable extension, flap 14, which extends from foldable line 123 to rear edge 13. The flaps 12 and 14 each have a length Fd and are foldable along the fold lines 121 and 123, respectively. The length Fd varies as a function of the size (depth) of the customer product intended to be placed with the cut out and the depth of the package (box) into which it is to be placed. The length Fd is selected to accommodate the positioning of the tray 10 within a box 30 as shown in FIGS. 3 and 3A. Note that the tray 10 may have side extensions/flaps (not shown). As noted above, the tray 10 may be formed of paperboard, cardboard, chipboard, SBS paperboard, or any like materials which may in turn be corrugated or un-corrugated.

Figure 2:
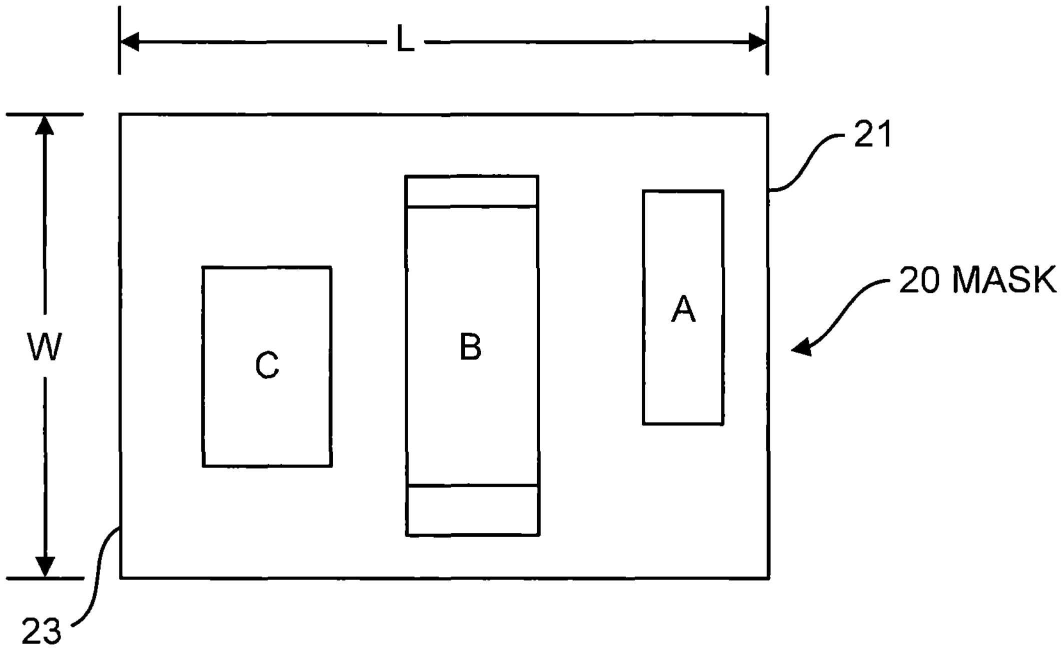
FIG. 2 IS a top view of a deluxe mask designed to cover the "exposed"surface of the tray.
Figure 2A:
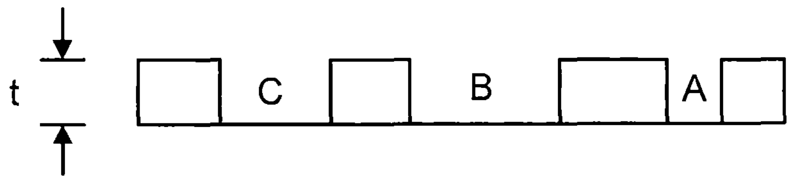
FIG. 2A is a cross-sectional drawing of the mask of FIG. 2.

Referring to FIGS. 2 and 2A, there is shown a mask 20 designed and formed to have a length L and a width W to cover the top exposed surface of the tray 10 with cut-outs (apertures) A, B and C to correspond to the cut outs (apertures) of the tray. The masks and the trays with their respective cut outs are formed using computer aided die cutting machines (not shown). In any event, the masks 20 are formed with cut outs corresponding to the cut outs of the trays. The cut outs of the mask are preferably, but not always necessarily, identical to those of the underlying tray. They may be made to vary in shape to cover part of the underlying tray cut out. The mask 20 may be of any suitable material (e.g., a printed board or sheet, or any material having similar characteristics to the following: SBS (solid bleached sulfate), TMP (thermo mechanical pulp), FBB (folding box board), SBS with Metalized Polyester Laminate, SBS with Metalized transfer, TMP with Metalized Polyester Laminate, TMP with Metalized transfer, FBB with Metalized Polyester Laminate, or FBB with Metalized transfer. The thickness (t) of the mask may range from less than 8 mils to more than 18 mils. As already noted, the top surface of the mask may be given any desired rich or exotic appearance.

Referring to FIGS. 3 and 3A, there is shown a mask 20 overlying and attached to the exposed surface of a tray 10 inserted in a box 30, ready to receive products in the pockets A, B and C. FIG. 3A is a cross-sectional view of FIG. 3 showing the tray 10 with mask 20 attached positioned within a box/package 30, ready for the placement of consumer goods (not shown) onto and within the pockets. Note the folded flaps 12 and 14 rest on the inside bottom layer of box 30. The length Fd of the flaps will generally be a function of the size of the customer product to be placed in the box and hence the height (H) of the box, as discussed above.

Figure 4:
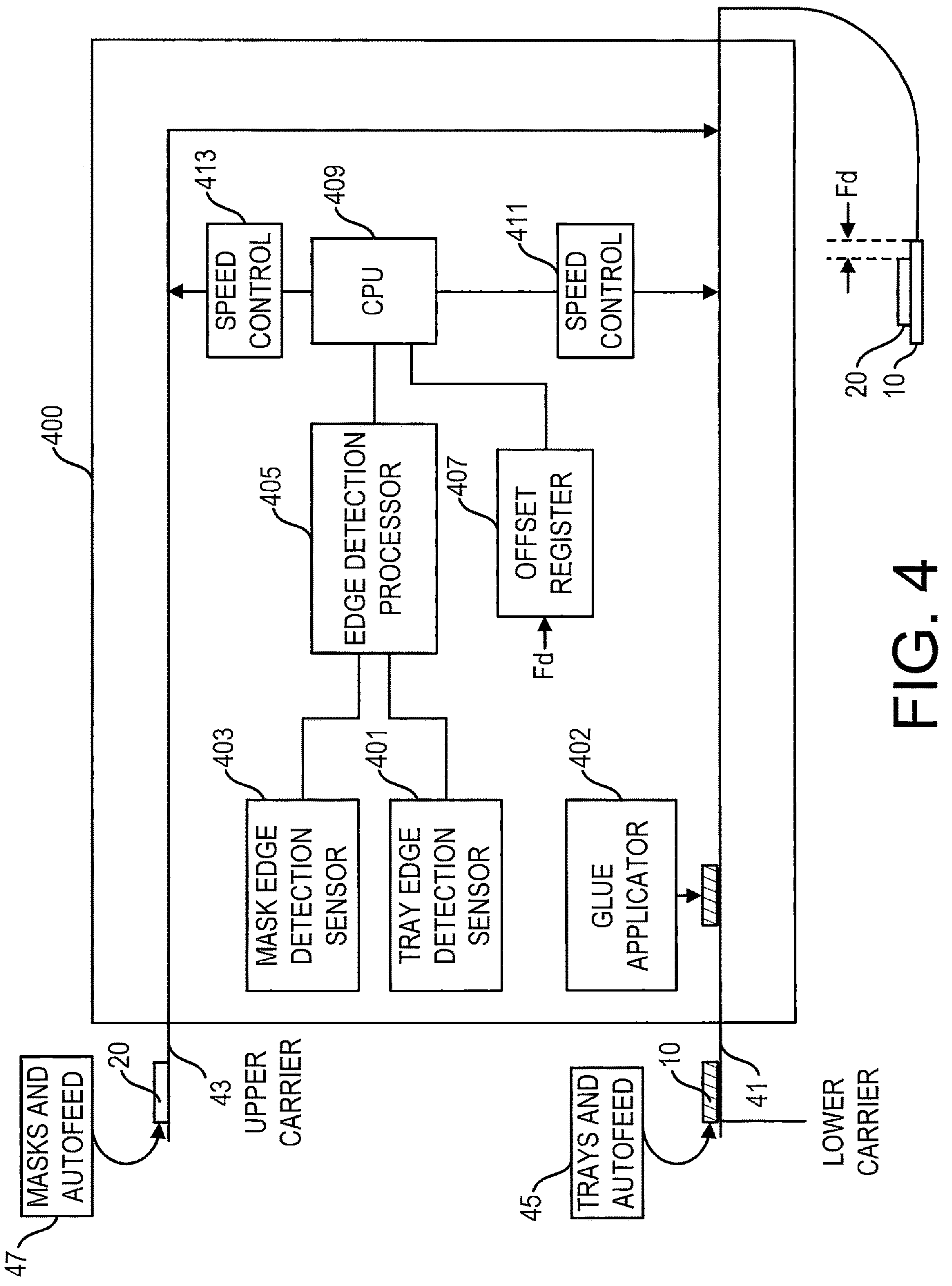
FIG. 4 is a highly simplified functional block diagram of a machine and some components for automatically placing a mask onto a tray in accordance with the invention.

FIG. 4 is an idealized block diagram showing functionally an apparatus for applying a mask to a tray in accordance with the invention. Referring to FIG. 4, in accordance with one embodiment of the invention, a mask 20 and a tray 10 are fed into a machine 400 such that: (a) the tray 10 is fed to and trough the machine by a lower registration carrier 41 which is motor driven and whose speed can be controlled (it could be but need not be servo motor driven); and (b) the mask 20 is fed to and through the machine by an upper registration carrier 43 which is motor driven and whose speed can be controlled. At least one of the two carriers (41, 43) should preferably be driven by a servo motor to ensure controlling the registration of the mask and tray. A selected number of trays 10 may be stacked and fed to the machine 400 via an auto-feed mechanism 45 and a selected number of masks 20 may be stacked and fed to machine 400 via an auto-feed mechanism 47.

The machine includes apparatus 402 for applying glue to the top surface of the tray. Alternatively the glue could be applied to the bottom surface of the mask (not shown). In one embodiment, the glue applicator was a drum. But, any known glue applicator could be used instead. The machine 400 also includes a tray edge detector sensor 401 to sense the front edge 11 of a tray 10 and a mask edge detector sensor 403 to sense the front edge 21 of a mask 20. Edge detector sensors 401 and 403 produce signals fed to an edge detector processor 405. The offset distance Fd of the tray between its front edge 11 and its fold line 121 is fed into an offset register 407. Note that the distance Fd will have different values for different sized tray flaps to accommodate boxes 30 of different heights/depths. The output of edge detector processor 405 and the output of offset register 407 are fed into a central processing unit (CPU) 409 which is programmed to control the movements of carriers 41 and 43. The central processing unit 409 then applies signals to speed controllers 411 and 413 which control, respectively, the speed and movement of lower carrier 41 and upper carrier 43.

Lower carrier 41 and upper carrier 43 may be vacuum belt driven devices which are used to carry the trays and masks. The speed of each carrier is controlled and the carriers are deployed relative to each other to ensure the mating of the mask and the trays in a predetermined manner. The machine 400 includes a "pinch point" mechanism (not shown in detail) at the convergence of the two conveyor belts (41, 43) for mating the mask and tray. In one embodiment, the conveyor belt 41 carrying the trays was run at a constant speed, but the speed could be controlled (i.e. varied) but once set remained constant. The speed of the conveyor belt 43 carrying the masks was varied in response to signals from the edge detectors to make sure there is correspondence of the cut outs in the trays and masks. Machine 400 includes a pinch point, at the convergence of the conveyor belts which allows the mask and tray to marry with their cut outs being in correspondence.

Machine 400 thus functions to apply and attach a mask 20 to a tray 10 such that there is accurate registration whereby the edges 21 and 23 of mask 20 correspond exactly to the fold lines 121 and 123, respectively of tray 10. As noted, machine 400 includes edge detection circuitry for determining the edge of the tray and the distance Fd and speed controllers 413 (for the upper carrier) and 411 (for the lower carrier) to ensure that the mask is accurately and automatically positioned on the tray.

Thus, in accordance with the invention a carrier 41 carries trays and another carrier 43 carries masks, with the carriers being deployed relative to each such that the mask is glued onto the tray and the mask is attached to cover the exposed surface of the tray in registration with the apertures formed on the mask corresponding to the apertures formed on and within the tray.

As noted above, per the embodiment of FIG. 4, a lower carrier 41 carries trays 10 and an upper carrier carries masks 20. It should be understood that these roles could be reversed. The glue applicator may be a drum or any other suitable device for applying a uniform layer of glue to the top surface of the tray. After the glue is applied carrier 41 continues to carry each tray until the point where each tray has a mask applied to it in register. The carriers may have their own servo drive. This enables the accuracy needed to automatically register the auto-mask apertures to the y.

Figure 5:
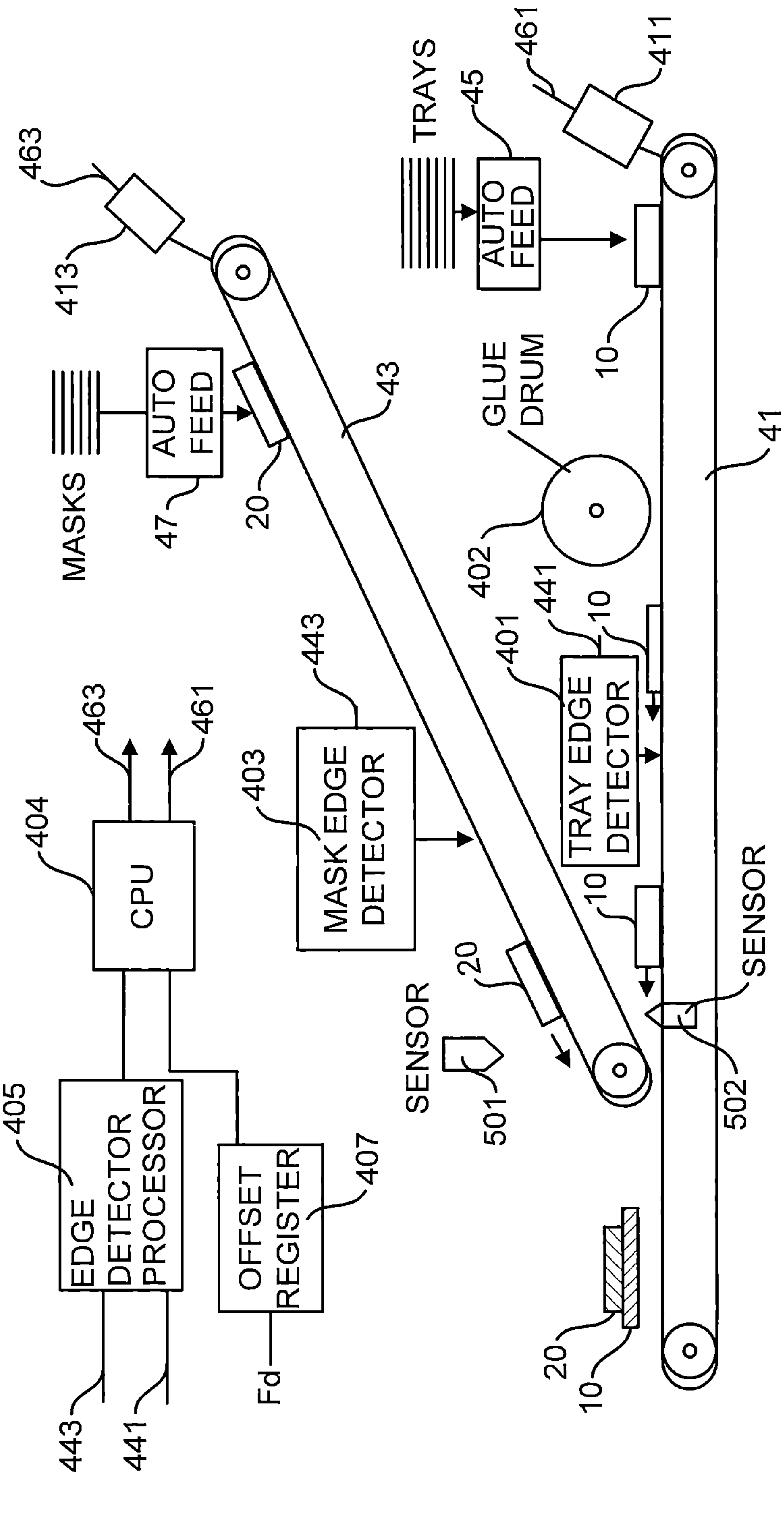
FIG. 5 is a highly simplified electro-mechanical drawing of parts of a machine for automatically placing a mask onto a tray in accordance with the invention.

Referring to FIG. 5, there is shown some of the mechanical and electrical components of the machine 400 used to accurately and automatically place a mask onto a tray. In FIG. 5 the flow of the trays and masks is shown going from right to left. The masks and the trays are fed onto an alignment device that is servo motor driven (e.g., servo motors 411, 413 for carriers 41 and 43, respectively). The servo motor (e.g., 411) controlling the lower carrier 41 will help speed up or slow down movement of a tray so a mask can be accurately placed onto the tray while coming off the upper carrier 43 in registration with the tray. The servo motor (e.g., 413) controlling the upper carrier 43 will help speed up or slow down movement of a mask so the mask can be accurately placed onto the tray while coming off the upper carrier 43 in registration with the tray. This is done using edge detection sensors and circuits.

As discussed above, trays 10 are fed directly onto and into a servo driven registration unit. For example, trays 10 are fed via auto-feed mechanism 45 onto one end of a carrier 41. As the tray travels along the carrier, glue can be applied to the top surface of each tray via a glue drum 402 so a mask can be attached thereto. As the tray moves along the carrier 41 a tray edge detector 401, positioned along carrier 41, senses the front edge of the tray 10 and produces a signal 441 applied to an edge detection processing unit 405. Masks 20 are fed directly onto and into a servo driven registration unit. For example, masks 20 are fed via auto-feed mechanism 47 onto one end of a carrier 43. As the mask moves along the carrier 43 a mask edge detector 403 positioned along carrier 43 senses the front edge of the mask 20 and produces a signal 443 applied to an edge detection processing unit 405. Additional sensors (e.g., 501, 503) may be incorporated in the machine to refine the detection scheme.

As noted above, an offset register 407 is fed information pertaining to the distance Fd (i.e., the distance between the front edge of the tray 11 and the fold line 121 of a tray). This variable (Fd) is needed to be taken into account to ensure that correspondence is established between the fold line of a tray and the front edge 21 of a mask.

The output of the edge detection processor unit 405 and the output of an offset register 407, which takes into account the distance Fd of the front (or rear) flap of the tray, are applied to a programmed computer unit (CPU) 409 to ensure that the movements of carrier belts 41 and 43 are controlled to ensure proper registration. This may be accomplished, as shown in FIG. 5, by having an output (461) from CPU 409 control servo motor 411 driving conveyor belt (carrier) 41 and another output (463) from CPU 409 control servo motor 413 driving conveyor belt (carrier) 43.

Both the upper and lower registration units as well as the glue pot all run on the edge detection feedback system so each mask and tray can be accurately placed to create a registered finished piece.

It should be appreciated that the masks may be applied to the trays by having the trays and the masks carried in parallel in the same direction, as suggested in the drawings. However, it should be understood that the masks may be applied to the trays in a perpendicular direction to the travel of the trays.

What is claimed is:

1. An apparatus for automating the attachment of a mask to a tray, where the tray has cut outs for the placement therein of customer products and the mask has cut outs corresponding to those of the tray, comprising:

- a speed controllable first conveyor belt for transporting the trays;
- a speed controllable second conveyor belt for transporting the masks;
- a tray feed mechanism for receiving trays and placing them sequentially onto the speed controllable first conveyor belt for transporting the trays;
- a mask feed mechanism for receiving masks and placing them sequentially onto the speed controllable second conveyor belt for transporting the masks;
- a gluing mechanism for applying glue to one of a bottom surface of the mask or a top surface of the tray;
- a tray edge detector responsive to sensing an edge of the tray for producing a signal indicative thereof;
- a mask edge detector responsive to sensing an edge of the mask for producing a signal indicative thereof;
- circuit means responsive to the signals produced by the tray and mask edge detectors for generating signals controlling the motion of the first and second conveyor belts to ensure alignment of the cut outs of the mask with the corresponding cut outs of the tray;
- wherein each tray includes: (a) a top central surface area of a width W and a length L, with said cut outs formed therein, having a front end and a rear end; (b) a front retractable extension flap of length Fd1 attached to and extending from said front end of the central surface area; and (c) a rear retractable extension flap of length Fd2 attached to and extending from the rear end of the central surface area; and
- wherein each mask has a surface area of a width W and a length L intended to be overlaid in alignment over the top central surface area of the corresponding tray; and
- wherein said apparatus includes an offset register adapted to receive the value of at least one of the length Fd1 and the length Fd2 and for supplying a flap control signal corresponding thereto to said circuit means; and
- wherein said circuit means includes a control mechanism responsive to said flap control signal for generating a signal to ensure alignment of the surface area of the tray with that of the mask and of the cut outs of the mask with the corresponding cut outs of the tray.

2. The apparatus as claimed in claim 1, wherein said gluing mechanism includes a drum positioned along, and overlying, said first conveyor belt for applying glue to the top surface of each tray.

3. The apparatus as claimed in claim 1, wherein said apparatus is adapted to receive trays, wherein each one of said trays is formed of any material having qualities and characteristics of the following materials: cardboard, paperboard, chipboard, or solid bleach sulfate paperboard.

4. The apparatus as claimed in claim 3, wherein said trays are formed of a corrugated fluted material.

5. The apparatus as claimed in claim 1, wherein said apparatus is adapted to receive masks, wherein each one of said masks is formed of any material having qualities and characteristics of the following materials: solid bleached sulfate, thermo mechanical pulp, folding box board, solid bleached sulfate with metalized polyester laminate, solid bleached sulfate with metalized transfer, thermo mechanical pulp with metalized polyester laminate, thermo mechanical pulp with metalized transfer, folding box board with metalized polyester laminate, or folding box board with metalized transfer.

6. The apparatus as claimed in claim 5, wherein said mask is a decorative mask.

7. The apparatus as claimed in claim 1, wherein the length Fd1 is equal to the length Fd2.

8. A method for automating attachment of a mask to a tray, where the tray has cut outs for the placement therein of customer products and the mask has cut outs corresponding to those of the tray, comprising steps of:

automatically feeding the tray onto a speed controllable first conveyor belt for transporting the trays;

automatically feeding the mask onto a speed controllable second conveyor belt for transporting the masks;

applying glue to one of a top surface of the tray and a bottom surface of the mask;

sensing an edge of the tray as it is moving along said first conveyor belt and producing a first signal indicative of the presence and location of the tray;

sensing an edge of the mask as it is moving along said second conveyor belt and producing a second signal indicative of the presence and location of the mask; and feeding said first and second signals to a control mechanism for controlling the movement of the first and second conveyor belts to ensure alignment of the cut outs of the mask with the corresponding cut outs of the tray; and wherein each tray includes: (a) a top central surface area of a width W and a length L, in which said cut outs are formed, with a front end and a rear end; (b) a front retractable extension flap of length Fd1 attached to and extending from said front end of the central surface area; and (c) a rear retractable extension flap of length Fd2 attached to and extending from the rear end of the central surface area; and wherein each mask has a surface area of a width W and a length L intended to be overlaid in alignment over the top central surface area of the corresponding tray; and further including the step of:

supplying the value of at least one of the length Fd1 and the length Fd2 to an offset register and generating a flap control signal corresponding thereto; and applying said flap control signal to said control mechanism to ensure alignment of the surface area of the tray with that of the mask and of the cut outs of the mask with the corresponding cut outs of the tray.

9. The method as claimed in claim 8, wherein the step of applying glue is performed by a gluing mechanism which includes a drum positioned along, and overlying, said first conveyor belt for applying glue to the top surface of each tray.

10. The method as claimed in claim 8, wherein each one of said trays is formed of any material having qualities and characteristics of the following materials: cardboard, paperboard, chipboard, or solid bleach sulfate paperboard.

11. The method as claimed in claim 8, wherein each one of said masks is formed of any material having qualities and characteristics of the following materials: solid bleached sulfate, thermo mechanical pulp, folding box board, solid bleached sulfate with metalized polyester laminate, solid bleached sulfate with metalized transfer, thermo mechanical pulp with metalized polyester, laminate, thermo mechanical pulp with metalized transfer, folding box board with metalized polyester laminate, or folding box board with metalized transfer.

12. The method as claimed in claim 8, wherein said trays are formed of a corrugated fluted material.

13. The method as claimed in claim 8, wherein said mask is a decorative mask.

14. The method as claimed in claim 8, wherein the length Fd1 is equal to the length Fd2.

* * * * *